(12) United States Patent
Stevens

(10) Patent No.: US 11,276,127 B1
(45) Date of Patent: Mar. 15, 2022

(54) RECOMMENDING MATCHES USING MACHINE LEARNING

(71) Applicant: Timothy Dirk Stevens, Littleton, CO (US)

(72) Inventor: Timothy Dirk Stevens, Littleton, CO (US)

(*) Notice: Subject to any disclaimer, the term of this patent is extended or adjusted under 35 U.S.C. 154(b) by 0 days.

(21) Appl. No.: 17/192,845

(22) Filed: Mar. 4, 2021

(51) Int. Cl.
| | |
|---|---|
| *G06N 3/08* | (2006.01) |
| *G06K 9/00* | (2006.01) |
| *G06K 9/62* | (2006.01) |
| *G06Q 50/00* | (2012.01) |
| *G06N 3/04* | (2006.01) |
| *G06Q 10/10* | (2012.01) |
| *G06Q 30/02* | (2012.01) |

(52) U.S. Cl.
CPC ............... *G06Q 50/01* (2013.01); *G06N 3/04* (2013.01); *G06N 3/08* (2013.01); *G06K 9/00268* (2013.01); *G06K 9/6256* (2013.01); *G06Q 10/105* (2013.01); *G06Q 30/0203* (2013.01)

(58) Field of Classification Search
CPC .. G06Q 50/01; G06Q 30/0203; G06Q 10/105; G06N 3/04; G06N 3/08; G06K 9/6256; G06K 9/00268
See application file for complete search history.

(56) References Cited

U.S. PATENT DOCUMENTS

| | | | |
|---|---|---|---|
| 6,735,568 B1 | 5/2004 | Buckwalter | |
| 7,454,357 B2 | 11/2008 | Buckwalter | |
| 7,592,910 B2 | 9/2009 | Tuck | |
| 7,613,706 B2 | 11/2009 | Terrill | |
| 7,676,466 B2 | 3/2010 | Terrill | |
| 7,814,027 B2 | 10/2010 | DeLuca | |
| 7,940,174 B2 | 5/2011 | Tuck | |
| 7,945,628 B1 | 5/2011 | Lunceford | |
| 8,010,546 B2 | 8/2011 | Terrill | |
| 8,010,566 B2 | 8/2011 | Terrill | |
| 8,014,763 B2 | 9/2011 | Hymes | |
| 8,051,013 B2 | 11/2011 | Terrill | |
| 8,144,007 B2 | 3/2012 | Tuck | |

(Continued)

OTHER PUBLICATIONS

Finkel et al., "Online Dating: A Critical Analysis From the Perspective of Psychological Science," Psychological Science in the Public Interest, Mar. 2012, 13(1):3-66.

(Continued)

*Primary Examiner* — Stephen S Hong
*Assistant Examiner* — Ahamed I Nazar
(74) *Attorney, Agent, or Firm* — Fish & Richardson P.C.

(57) ABSTRACT

A system and method for recommending matches between persons are provided. Data processing is performed using artificial intelligence technology. A supervised machine learning engine is trained from empirical data about existing relationships which have been evaluated as to quality of the relationships. Quality of candidate relationships is calculated as an output of the supervised machine learning engine when provided input data of attributes of two candidate persons. Likelihood of a successful relationship between two candidate persons is predicted by comparing the calculated quality of the candidate relationship against a threshold. The prediction in this learning task may be made by a neural network. A user is notified of a candidate match that is likely to become a successful relationship.

30 Claims, 13 Drawing Sheets

(56) References Cited

U.S. PATENT DOCUMENTS

| | | | |
|---|---|---|---|
| 8,195,668 B2 | 6/2012 | Drennan | |
| 8,204,280 B2 | 6/2012 | Kluesing | |
| 8,332,418 B1 | 12/2012 | Giordani | |
| 8,473,490 B2 | 6/2013 | Bonilla | |
| 8,566,327 B2 | 10/2013 | Carrico | |
| 8,583,563 B1 | 11/2013 | Bonilla | |
| 8,635,167 B2 | 1/2014 | Buckwalter | |
| 8,782,038 B2 | 7/2014 | Mishra | |
| 8,898,233 B2 | 11/2014 | Ganetakos | |
| 8,923,574 B2 | 12/2014 | Kodesh | |
| 8,958,778 B2 | 2/2015 | Lewis | |
| 8,984,065 B2 | 3/2015 | Carter | |
| 9,064,274 B2 | 6/2015 | Margines | |
| 9,070,088 B1 | 6/2015 | Baveja | |
| 9,104,905 B2 | 8/2015 | Whitehill | |
| 9,122,759 B2 | 9/2015 | Carter | |
| 9,158,821 B1 | 10/2015 | Quisel | |
| 9,245,301 B2 | 1/2016 | Klawitter | |
| 9,251,220 B2 | 2/2016 | Klawitter | |
| 9,342,855 B1 | 5/2016 | Bloom | |
| 9,348,843 B1 | 5/2016 | Lewis | |
| 9,449,282 B2 | 9/2016 | Diaz | |
| 9,495,301 B2 | 11/2016 | Koh | |
| 9,503,547 B2 | 11/2016 | Pedraza | |
| 9,536,221 B2 | 1/2017 | Frind | |
| 9,537,706 B2 | 1/2017 | Frind | |
| 9,560,156 B1 | 1/2017 | Rana | |
| 9,672,289 B1 | 6/2017 | Frind | |
| 9,679,259 B1* | 6/2017 | Frind | G06N 5/022 |
| 9,684,725 B1 | 6/2017 | Carter | |
| 9,710,520 B2 | 7/2017 | Srivastava | |
| 9,753,948 B2 | 9/2017 | Lo | |
| 9,775,015 B1 | 9/2017 | Mishra | |
| 9,785,703 B1 | 10/2017 | Carter | |
| 9,824,123 B2 | 11/2017 | Ochandio | |
| 9,830,669 B1 | 11/2017 | Frind | |
| 9,836,533 B1 | 12/2017 | Levi | |
| 9,959,023 B2 | 5/2018 | Rad | |
| 10,019,653 B2 | 7/2018 | Wilf | |
| 10,025,835 B2 | 7/2018 | Lerner | |
| 10,146,882 B1 | 12/2018 | Carter | |
| 10,149,267 B2 | 12/2018 | Burrell | |
| 10,152,193 B1 | 12/2018 | Hurwitz | |
| 10,169,708 B2 | 1/2019 | Baveja | |
| 10,203,854 B2 | 2/2019 | Rad | |
| 10,257,676 B1 | 4/2019 | Mishra | |
| 10,286,327 B2 | 5/2019 | Xue | |
| 10,320,734 B1 | 6/2019 | Mishra | |
| 10,380,158 B2 | 8/2019 | Diaz | |
| 10,387,506 B2 | 8/2019 | Mishra | |
| 10,467,677 B2 | 11/2019 | Wilson | |
| 10,489,445 B1* | 11/2019 | Carter | G06K 9/00677 |
| 10,523,622 B2 | 12/2019 | Barfield | |
| 10,540,607 B1 | 1/2020 | Oldridge | |
| 10,565,276 B2 | 2/2020 | Finder | |
| 10,599,734 B2 | 3/2020 | Ahn | |
| 10,610,786 B2 | 4/2020 | Aghdaie | |
| 10,624,054 B2 | 4/2020 | Burrell | |
| 10,726,087 B2 | 7/2020 | Karakas | |
| 10,751,629 B2 | 8/2020 | Xue | |
| 10,769,221 B1* | 9/2020 | Frind | H04L 51/32 |
| 10,776,758 B1 | 9/2020 | Benedict | |
| 10,810,403 B2 | 10/2020 | Frolovichev | |
| 10,817,804 B1 | 10/2020 | Ozoka | |
| 10,854,336 B1 | 12/2020 | Neumann | |
| 10,868,789 B2 | 12/2020 | Mishra | |
| 10,905,962 B2 | 2/2021 | Kaethler et al. | |
| 2006/0018522 A1 | 1/2006 | Sunzeri | |
| 2007/0050354 A1 | 3/2007 | Rosenberg | |
| 2009/0049127 A1 | 2/2009 | Juan | |
| 2009/0177496 A1 | 7/2009 | Tuck | |
| 2010/0262611 A1* | 10/2010 | Frind | G06Q 10/10 707/748 |
| 2013/0090979 A1 | 4/2013 | Tuck | |
| 2013/0212173 A1 | 8/2013 | Cathcart | |
| 2014/0108308 A1 | 4/2014 | Stout | |
| 2014/0180942 A1 | 6/2014 | Buckwalter | |
| 2014/0221866 A1 | 8/2014 | Quy | |
| 2014/0258260 A1 | 9/2014 | Rayborn | |
| 2014/0297379 A1 | 10/2014 | Bicanin | |
| 2015/0287146 A1 | 10/2015 | El Daher | |
| 2015/0363751 A1 | 12/2015 | Covello, III | |
| 2016/0005134 A1 | 1/2016 | von Gontard | |
| 2016/0063646 A1 | 3/2016 | Myhan | |
| 2016/0063647 A1 | 3/2016 | Myhan | |
| 2016/0086137 A1 | 3/2016 | Ackerman | |
| 2016/0275531 A1* | 9/2016 | Martyn | G06Q 50/01 |
| 2017/0024519 A1 | 1/2017 | Farley | |
| 2017/0228819 A1 | 8/2017 | Shenkar | |
| 2017/0255907 A1 | 9/2017 | Page-Romer | |
| 2018/0025440 A1 | 1/2018 | Wheeler | |
| 2018/0053261 A1 | 2/2018 | Hershey | |
| 2018/0337928 A1 | 11/2018 | Pelletier | |
| 2019/0147366 A1 | 5/2019 | Sankaran | |
| 2019/0179516 A1 | 6/2019 | Rad | |
| 2019/0236722 A1 | 8/2019 | Bhat | |
| 2019/0251640 A1 | 8/2019 | Sharp | |
| 2019/0303140 A1 | 10/2019 | Kelly | |
| 2019/0362440 A1 | 11/2019 | Williams | |
| 2020/0034604 A1 | 1/2020 | Alrasheed | |
| 2020/0065916 A1 | 2/2020 | Dahan | |
| 2020/0092248 A1 | 3/2020 | Brennan | |
| 2020/0104330 A1 | 4/2020 | Kairinos | |
| 2020/0137019 A1 | 4/2020 | Barfield, Jr. | |
| 2020/0143483 A1 | 5/2020 | Smith | |
| 2020/0175047 A1 | 6/2020 | Diaz | |
| 2020/0228941 A1 | 7/2020 | Angapova | |
| 2020/0265526 A1 | 8/2020 | Ogunsusi | |
| 2020/0285700 A1 | 9/2020 | Narayanan | |
| 2020/0351234 A1 | 11/2020 | Gaon | |
| 2020/0364806 A1 | 11/2020 | Wang | |

OTHER PUBLICATIONS

He et al., "Deep residual learning for image recognition," arXiv:1512.03385v1, Dec. 2015, 12 pages.

Maroufizadeh et al., "The quality of marriage index (QMI): a validation study in infertile patients," BMC Research Notes, Aug. 2019, 12:507.

* cited by examiner

```
# Stage 1                                                              ─ 1101
X = Conv2D(64, (7, 7), strides = (2, 2), name = 'conv1', kernel_initializer =
glorot_uniform(seed=0))(X)
X = BatchNormalization(axis = 3, name = 'bn_conv1')(X)
X = Activation('relu')(X)
X = MaxPooling2D((3, 3), strides=(2, 2))(X)
# Stage 2                                                              ─ 1102
X = convolutional_block(X, f = 3, filters = [64, 64, 256], stage = 2, block='a
', s = 1)
X = identity_block(X, 3, [64, 64, 256], stage=2, block='b')
X = identity_block(X, 3, [64, 64, 256], stage=2, block='c')
# Stage 3                                                              ─ 1103
X = convolutional_block(X, f = 3, filters = [128, 128, 512], stage = 3, bloc
k='a', s = 2)
X = identity_block(X, 3, [128, 128, 512], stage=3, block='b')
X = identity_block(X, 3, [128, 128, 512], stage=3, block='c')
X = identity_block(X, 3, [128, 128, 512], stage=3, block='d')
# Stage 4                                                              ─ 1104
X = convolutional_block(X, f = 3, filters = [256, 256, 1024], stage = 4, bloc
k='a', s = 2)
X = identity_block(X, 3, [256, 256, 1024], stage=4, block='b')
X = identity_block(X, 3, [256, 256, 1024], stage=4, block='c')
X = identity_block(X, 3, [256, 256, 1024], stage=4, block='d')
X = identity_block(X, 3, [256, 256, 1024], stage=4, block='e')
X = identity_block(X, 3, [256, 256, 1024], stage=4, block='f')
# Stage 5                                                              ─ 1105
X = convolutional_block(X, f = 3, filters = [512, 512, 2048], stage = 5, bloc
k='a', s = 2)
X = identity_block(X, 3, [512, 512, 2048], stage=5, block='b')
X = identity_block(X, 3, [512, 512, 2048], stage=5, block='c')
# Average pooling                                                      ─ 1106
X = AveragePooling2D(pool_size=(2, 2), strides=None, padding='valid', data_for
mat=None)(X)
# Output layer                                                         ─ 1107
X = Flatten()(X)
X = Dense(classes, activation='sigmoid', name='fc' + str(classes),
kernel_initializer = glorot_uniform(seed=0))(X)
```

FIG. 11

RECOMMENDING MATCHES USING MACHINE LEARNING

FIELD

The subject technology generally relates to recommending matches between persons, and, in particular, relates to systems and methods to recommend likely candidates for a successful relationship.

BACKGROUND

It is useful to provide people assistance when they are seeking a successful relationship with a second person. Present assistance approaches largely consist of heuristics and rule based matching. However, these approaches do not leverage machine learning from data.

SUMMARY

According to various aspects of the subject technology, a method for recommending matches between persons is provided. The method comprises training a supervised machine learning engine from empirical data about existing relationships which have been evaluated as to quality of the relationships. The method further comprises using the trained supervised machine learning engine to evaluate candidate relationships to calculate the quality of the candidate relationship. The method further comprises predicting the likelihood of a successful relationship by comparing the calculated quality of the candidate relationship against a threshold. The method further comprises notifying a user of a candidate match that is likely to become a successful relationship.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

FIG. 11 illustrates the implementation of a residual neural network.

DETAILED DESCRIPTION

Overall Process of Using Supervised Machine Learning to Recommend Matches

Figure 1:
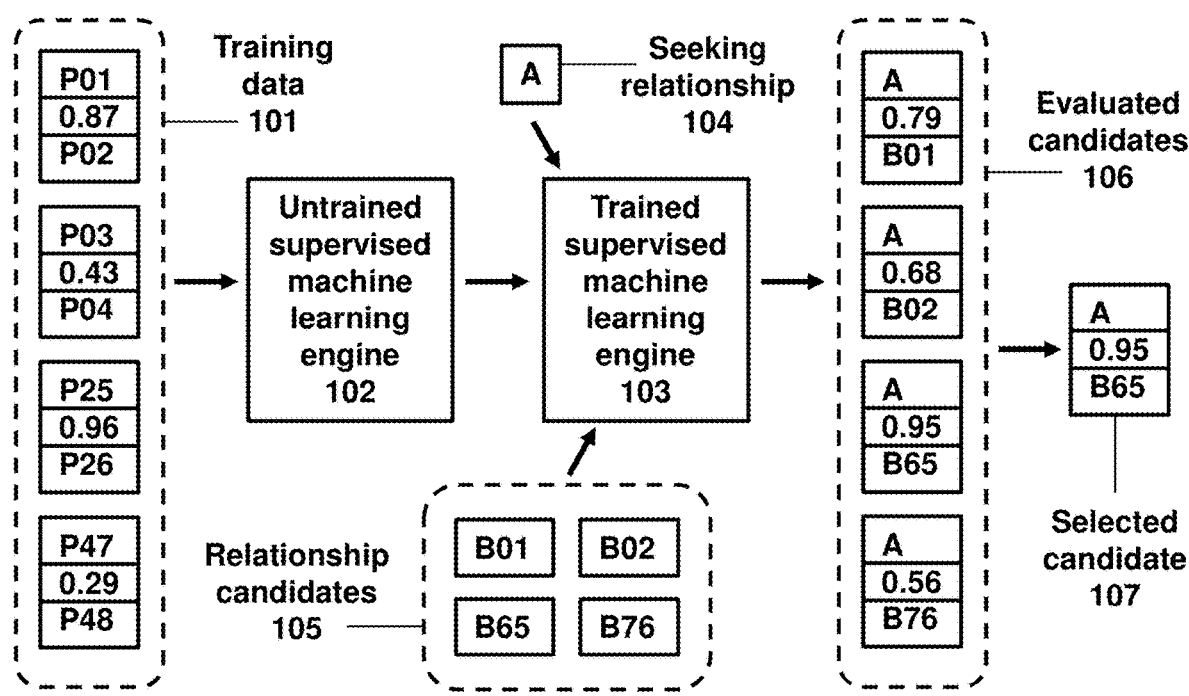
FIG. 1 illustrates the overall process of using supervised machine learning to recommend matches.

FIG. 1 illustrates the overall process of using supervised machine learning to recommend matches. Machine learning is supervised when it learns from training data that has been previously evaluated so as to provide a basis for the training. The process begins with training data 101. This example is simplified to show four data items in the training data. In an illustrative embodiment the training data would contain many data items. Each data item represents an existing relationship between two people, denoted for example as P01 and P02 in the top data item. The data item for P01 includes attributes of the first person in the relationship and the data item for P02 includes attributes of the second person in the relationship. Each existing relationship has been evaluated for quality of the relationship, here labeled by a value between 0 and 1 with higher values representing higher qualities. The existing relationship between persons P25 and P26 is labeled as higher quality (0.96) while the existing relationship between persons P47 and P48 is labeled as lower quality (0.29).

It is important that the training data include relationships of varying quality. For example, in the machine learning domain of classifying images as cat or non-cat, the training data includes images of cats labeled as cat and includes images of other animals such as dogs or horses labeled as non-cat. This range of training data allows the machine learning to recognize patterns that distinguish cats from other animals. In the application of technology in this description to relationships between persons the training data includes successful relationships with higher quality and unsuccessful relationships with lower quality.

The training data 101 is inputted to train an untrained supervised machine learning engine 102. The details of this training process will be described below. After training, the untrained supervised machine learning engine 102 becomes a trained supervised machine learning engine 103. The trained supervised machine learning engine 103 can then accept inputs of attributes of a first person in a relationship 104 and attributes of a second person in a relationship 105 to output a value predicting the quality of the relationship 106. The input of the attributes of a first person in a relationship 104 may be initiated in response to a request from that first person. The input of the attributes of a first person in a relationship 104 may be performed on a periodic basis.

This example is simplified to show four persons as candidates for a relationship, shown as B01, B02, B65 and B76. In an illustrative embodiment the database of candidate persons for a relationship would contain many persons. The data item for each candidate person such as B01 includes attributes of that person. Similarly the data item for the person A seeking a relationship 104 includes attributes of that person. The machine learning engine 103 is utilized repeatedly, once per candidate pairing between person A 104 and one candidate person 105. Each utilization of the machine learning engine 103 outputs a numerical evaluation of a relationship between the two persons. This produces a list of evaluated candidates 106 including the numerical evaluation of each relationship. Each entry in the list of evaluated candidates 106 records the identification of the matched persons and the numerical evaluation predicting the quality of that relationship. A prediction of the likelihood of a successful relationship may be made by comparing the numerical evaluation of each relationship against a threshold to assess whether it might be successful or unsuccessful.

As a final step the list of evaluated candidates 106 is sorted to recommend a match with the highest value for predicted relationship quality resulting in a selected candidate 107. In this example the candidate relationship between persons A and B 65 resulted in the highest predicted value for relationship quality from the four candidate relationships in the list of evaluated candidates 106. Other embodiments might recommend matches with multiple selected candidates 107 for a relationship, such as three candidates or five candidates or a number that is selected by the system or selected by the person seeking a relationship 104.

The trained supervised machine learning engine 103 directly outputs a value evaluating the quality of a relationship between the two persons whose attributes data were input to the supervised machine learning engine 103. The outputted values for evaluated candidates 106 are directly used to recommend successful candidates 107. Use of the outputted values for evaluated candidates 106 does not use any heuristics such as "birds of a feather flock together". Use of the outputted values for evaluated candidates 106 does not use any rule-based methods crafted around specific attributes of persons. Since the supervised machine learning engine 103 is directly driven by the nature of the data, the nature of the data determines the specific application.

Figure 2:
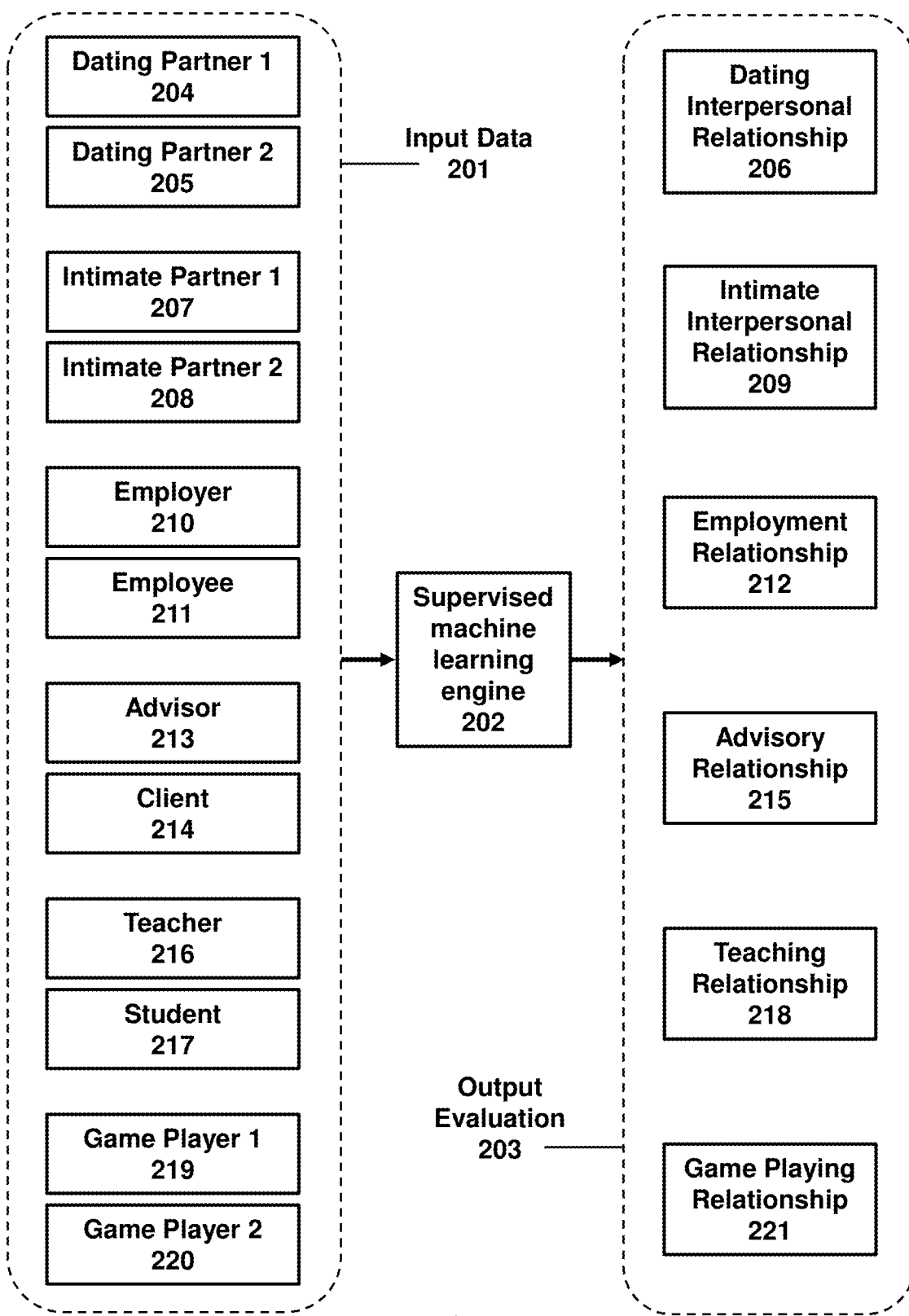
FIG. 2 illustrates the correspondence of input data types to output evaluation types.

FIG. 2 illustrates the correspondence of input data types to output evaluation types. Input data 201 is provided to a supervised machine learning engine 202 to output the output evaluation 203. Data describing partner 1 204 and partner 2 205 who are dating results in applying the supervised machine learning engine 202 to predict candidate relationships for dating interpersonal relationships 206. Here a dating interpersonal relationship 206 may be understood to be the usual use of the term dating to comprise finding a platonic relationship, finding a non-romantic relationship, finding a friend, finding a person for having fun together, or finding a person for doing interesting things together. Data describing partner 1 207 and partner 2 208 who are in an intimate interpersonal relationship results in applying the supervised machine learning engine 202 to predict candidate relationships for intimate interpersonal relationships 209. Here an intimate interpersonal relationship 209 may be understood to be the usual use of the term intimate to comprise finding a romantic partner, finding a sexual partner, finding a committed relationship, finding a long lasting relationship, or finding a partner for marriage whether a legal marriage, a civil union, a domestic partnership or a cohabitation. Data describing relationships of employers 210 and employees 211 results in applying the supervised machine learning engine 202 to predict candidate relationships for employment 212. Data describing relationships of advisors 213 and clients 214 results in applying the supervised machine learning engine 202 to predict candidate advisors to advise a client 215. An advisor 213 may comprise a financial advisor, a medical advisor, an insurance advisor, a real estate advisor, a legal advisor or other types of advisors. Data describing relationships of teachers 216 and students 217 results in applying the supervised machine learning engine 202 to predict candidate teachers to teach a student 218. Data describing relationships of player 1 playing multiplayer games 219 and player 2 playing multiplayer games 220 results in applying the supervised machine learning engine 202 to predict candidate persons to play multiplayer games 221. Despite considerable effort by industry to recommend matches for dating interpersonal relationships, for intimate interpersonal relationships, for employment candidates, for advisors, for teachers and for players of multiplayer games, no such use of the direct outputs of a supervised machine learning engine 202 has been made to solve these long-felt needs.

Figure 3:
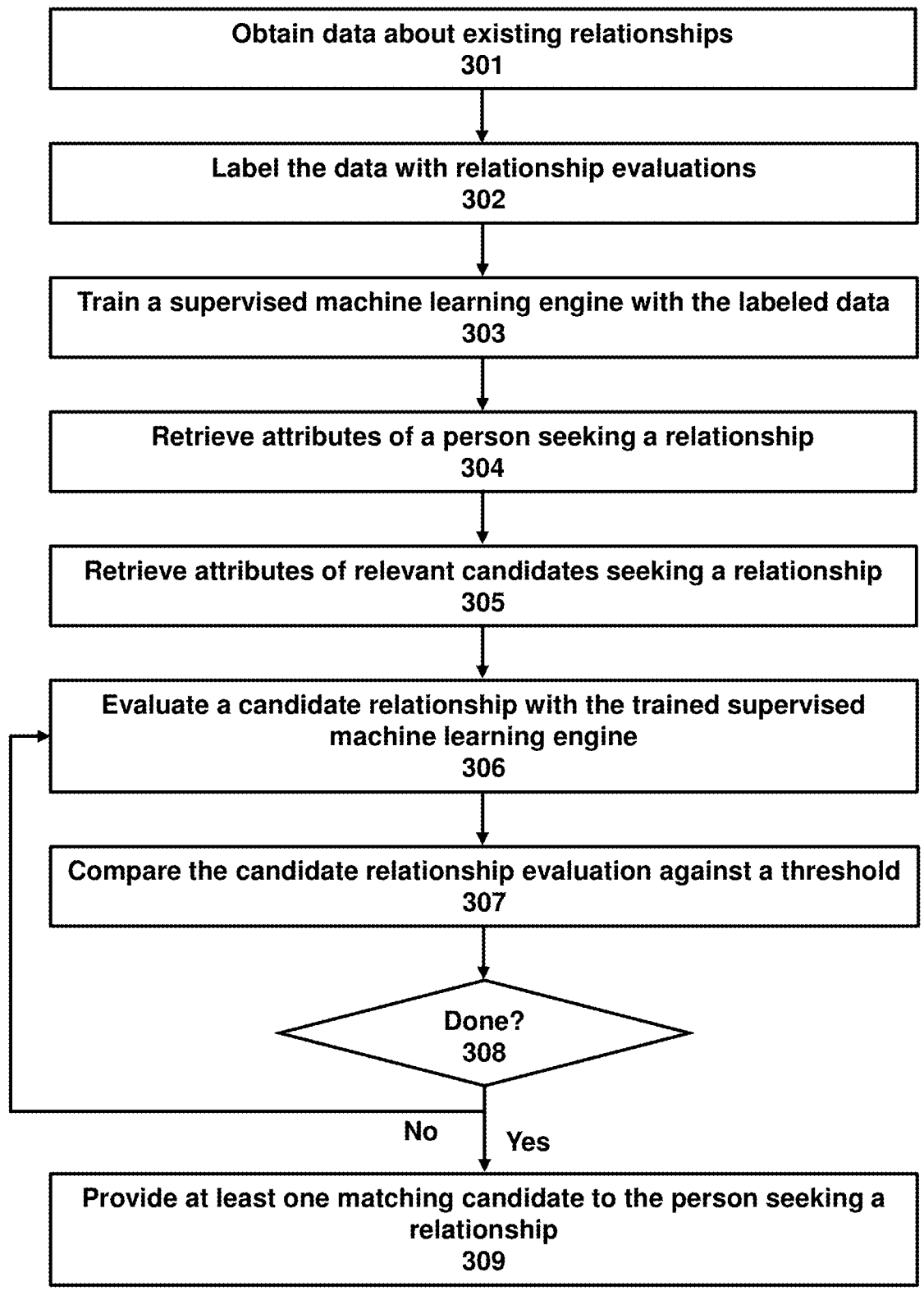
FIG. 3 illustrates a flow chart of using supervised machine learning to recommend matches.

FIG. 3 illustrates a flow chart of using supervised machine learning to recommend matches. This is the same process as in FIG. 1 illustrated here as steps. Data is obtained about existing relationships 301. Each data item in the data 301 is labeled with a value assessing the quality of the relationship 302. A supervised machine learning engine 303 is trained with the labeled training data 302. The attributes of a person seeking a relationship 304 are retrieved and the attributes of candidate persons seeking a relationship 305 are retrieved. The trained supervised machine learning engine is operated to evaluate each candidate relationship 306 to output a value predicting the quality of that relationship. Each predicted relationship quality value is compared against a threshold 307 to assess the likelihood of a successful relationship. This process is repeated for all candidate persons seeking a relationship 305 until done 308. At least one matching candidate is provided to the person seeking a relationship 309.

Training a Supervised Machine Learning Engine

Figure 4:
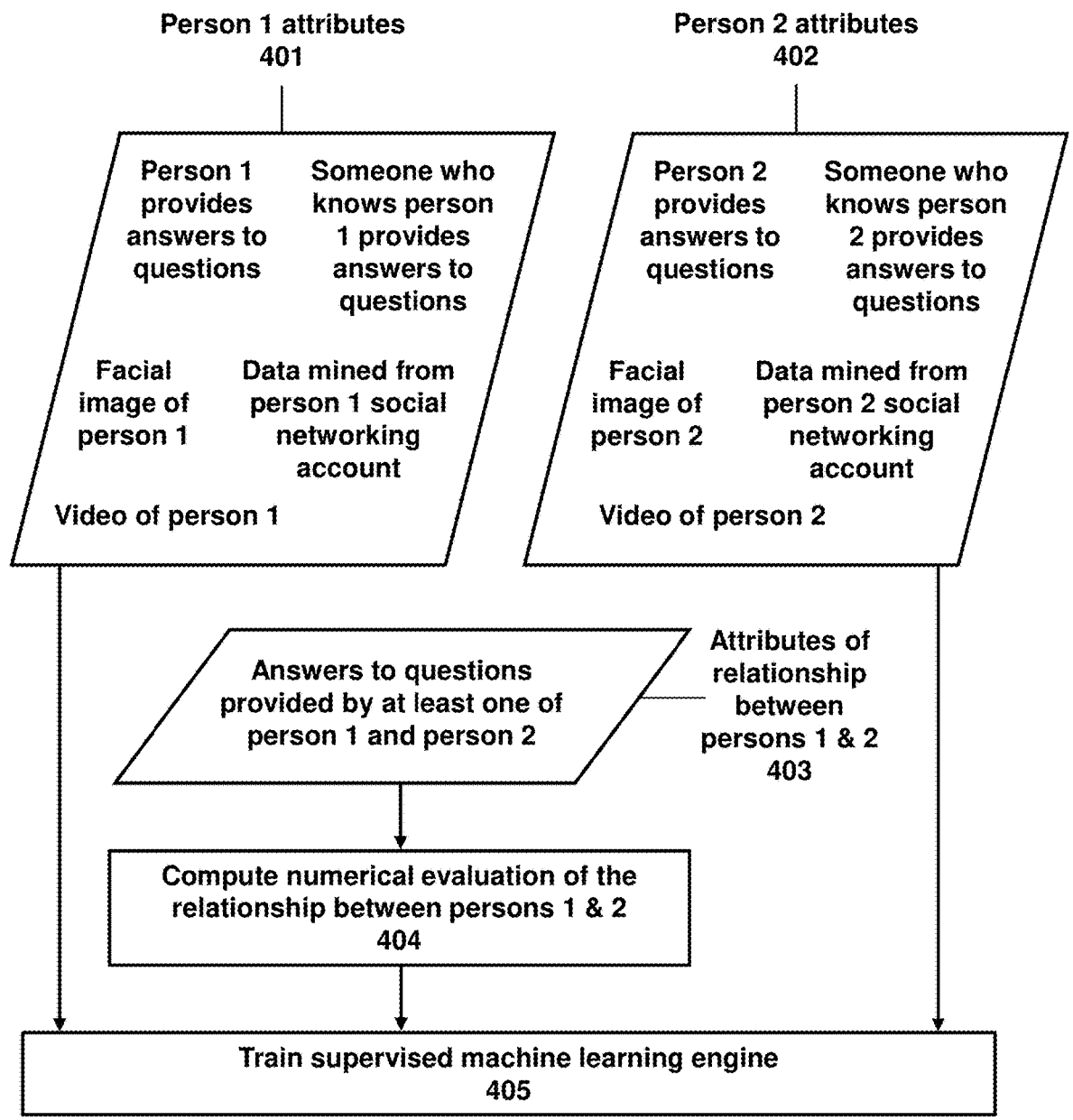
FIG. 4 illustrates the attributes of data used to train a supervised machine learning engine.

FIG. 4 illustrates the attributes of data used to train a supervised machine learning engine. Each data item used to train a supervised machine learning engine 405 comprises attributes of person 1 401 in an existing relationship, attributes of person 2 402 in an existing relationship, and attributes of the relationship between person 1 and person 2 403. The attributes of each person in an existing relationship 401 or 402 may comprise answers that person has provided to a list of survey questions. Alternatively or additionally the answers to the list of survey questions about a person may be provided by at least one person who knows that person. The attributes of each person in an existing relationship 401 or 402 may comprise at least one facial image of that person. Positive assortative mating, also referred to as homogamy, is a mating pattern in which individuals with similar observable characteristics mate with one another more frequently than would be expected under a random mating pattern. The facial images may be included in the attributes of each person in an existing relationship 401 or 402 to enable a supervised machine learning engine to learn patterns associated with assortative mating.

The attributes of each person in an existing relationship 401 or 402 may comprise data mined from at least one social networking account of that person. The attributes of each person in an existing relationship 401 or 402 may comprise at least one video of that person. A video may comprise a short video of the person speaking about themselves, for example ten to fifteen seconds long. Research shows that the opinions we form in the first moments after meeting someone play a major role in determining the course of a relationship.

In an illustrative embodiment survey questions about a person in a relationship between two people may be posed with a Likert scale with answers such as Strongly Agree, Agree, Neutral, Disagree or Strongly Disagree. Survey questions regarding personality may be taken from established questionnaires such as the Big Five test which includes 50 questions using a 3-point Likert scale (e.g. "I have a vivid imagination" or "I have frequent mood swings") to provide percentile scores for extraversion, conscientiousness, agreeableness, neuroticism (emotional stability) and openness to experience. Example questions regarding a dating interpersonal relationship between two people may be "I like to try new things" or "I enjoy going to concerts." Example questions regarding an intimate interpersonal relationship between two people may be "I value saving money for retirement" or "I want to have children." Example questions regarding a relationship between an employer and an employee may be "I prefer to work independently" or "I have time to train new employees." Example questions regarding a relationship between an advisor and a client may be "When the market goes down, I tend to sell some of my riskier investments and put money in safer investments" or "I prefer clients with greater than $500,000 in assets." Example questions regarding a relationship between a teacher and a student may be "I need tutoring on a daily basis" or "I prefer to teach students online rather than in person." Example questions regarding a relationship between two persons playing a multiplayer game may be "When playing Minecraft I have a passion to build complicated things" or "I am cooperative with other players."

The attributes of the relationship between person 1 and person 2 403 may comprise answers provided to a list of survey questions. These answers might be provided separately by each of the two persons or might be provided as one set of answers by both persons.

In an illustrative embodiment survey questions about a relationship between two people may be posed with a Likert scale with answers such as Strongly Agree, Agree, Neutral, Disagree or Strongly Disagree. An example question regarding a dating interpersonal relationship may be "My date and I both laughed at the same things." Survey questions regarding an intimate interpersonal relationship may be taken from established questionnaires for quality of relationships. An example question regarding an intimate interpersonal relationship may be "I feel that I can confide in my partner about virtually anything." An example question regarding a relationship between an employer and an employee may be "My supervisor generally listens to employee opinions." An example question regarding a relationship between an advisor and a client may be "My client usually follows my financial advice." An example question regarding a relationship between a teacher and a student may be "My tutor cares about me." An example question regarding a relationship between two persons playing a multiplayer game may be "My gaming colleague has a sense of humor."

The attributes of the relationship between person 1 and person 2 403 are used to compute a numerical evaluation of that relationship 404. The computed relationship value 404 is used to label the relationship represented by the data of attributes of person 1 401 and attributes of person 2 402 to use that data as training data. This training data is used to train the supervised machine learning engine 405.

In an illustrative embodiment the attributes of the relationship between person 1 and person 2 may comprise answers to the Relationship Assessment Scale (RAS) containing seven questions rated on a 5-point Likert scale ranging from 1 to 5. Total summed scores range from 7 to 35, with higher scores reflecting better relationship satisfaction. In an alternate embodiment the attributes of the relationship between person 1 and person 2 may comprise answers to the Couples Satisfaction Index (CSI) which has versions such as the CSI-4 with four questions or the CSI-32 with 32 questions. The CSI-32 includes one question with the answer ranging from 0-6 ("Please indicate the degree of happiness, all things considered, of your relationship") with the answers to the other 31 questions ranging from 0-5, thus the total summed score can range from 0 to 161. Higher scores indicate higher levels of relationship satisfaction. CSI-32 scores falling below 104.5 suggest notable relationship dissatisfaction.

Figure 5:
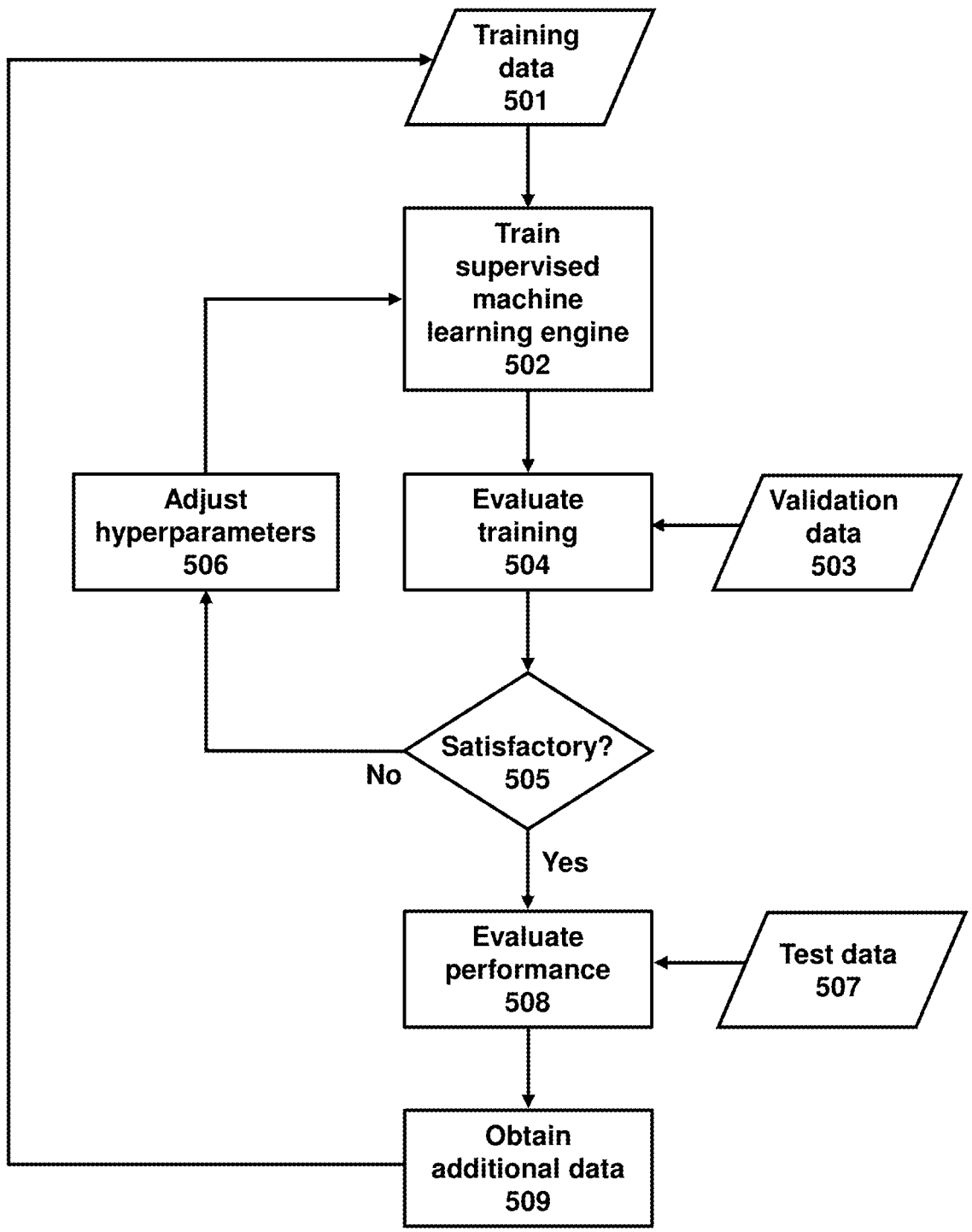
FIG. 5 illustrates a flow chart of training a supervised machine learning engine.

FIG. 5 illustrates a flow chart of training a supervised machine learning engine. The data about existing relationships is divided into three datasets called training data 501, validation data 503 and test data 507. In the field of supervised machine learning the validation data 503 is sometimes referred to as development data. The training data 501 is used to train a supervised machine learning engine 502. Training the supervised machine learning engine 502 comprises minimizing the difference between the numerical evaluation of a relationship output by the supervised machine learning engine and the numerical evaluation of that relationship obtained from the training data. The trained supervised machine learning engine 502 is then evaluated 504 by operating it against the validation data 503. Since the validation data 503 is labeled as to actual value of each relationship, the difference between the actual value and the value predicted by the machine learning engine is measured as an error value. The overall error value across the validation data 503 is examined as to whether or not is it satisfactory 505. Should the machine learning engine be overtrained for example on the training data then it would perform noticeably poorer on the validation data.

The training process is controlled by a number of parameters known as hyperparameters. One hyperparameter is the learning rate. The learning rate is a factor applied to adjustments made to a supervised machine learning engine during training. Too low a learning rate can result in too long a training time. Too high a learning rate can result in the training oscillating rather than converging on improved performance. Different techniques can be used to initialize weights in a supervised machine learning engine (e.g. Normal, Xavier, Kaiming) and the type of initialization technique can be another hyperparameter. An approach to reduce overtraining to the training dataset is called regularization. One technique for regularization is called dropout, to randomly remove connections in a supervised machine learning engine and the dropout rate (e.g. 0.3, 0.8) can be another hyperparameter. Some choices for a hyperparameter value may be expressed on a linear scale or other choices such as for learning rate may be expressed on a logarithmic scale. A grid may be utilized to plot the candidate sets of hyperparameter choices. These hyperparameter choices in a grid may be searched in a coarse to fine tuning process to narrow in on high performance choices. The hyperparameter choices may be selected at random rather than from a grid. The hyperparameter tuning may be guided by bias which is the error between performance on the training dataset and ideal performance or performance by a human expert. The hyperparameter tuning may be guided by variance which is the difference in error rate between the training dataset 501 and the validation dataset 503. High bias may indicate a need to train for a longer time while high variance may indicate a need for more training data or increased regularization.

Should the evaluation 504 be deemed unsatisfactory 505 then the training hyperparameters are adjusted 506 and the training is repeated 502 using the training data 501. This process repeats until the hyperparameters are tuned so that the training is deemed satisfactory 505. Then the performance of the trained supervised machine learning engine is evaluated using the test data 507. This performance evaluation is to ensure that the machine learning engine has not been overtrained on the combination of the training data 501 and the validation data 503. Should the performance on the test data 507 exhibit any problems then it would be necessary to segment new divisions of data about existing relationships into training data 501, validation data 503 and test data 507 to repeat the process of completing tuning of the training hyperparameters.

Repeating the training process may be enhanced should additional data be obtained 509. The training process may be repeated should the performance evaluation 508 be unsatisfactory or may be repeated to update the training to further improve performance when additional training data 509 becomes available. The additional data 509 may be additional existing relationships of persons who have never interacted with the system using the supervised machine learning engine. The additional data 509 may be relationships of persons who have previously interacted with the system using the supervised machine learning engine, been matched and then gone on to form relationships that can be evaluated to become additional training data. In the field of machine learning training data can sometimes be augmented to form a larger training dataset. Augmentation can be performed by generating synthetic data from empirical data. In the machine learning domain of classifying images as cat or non-cat for example an image of a cat may be flipped right to left to provide a new training image or may be brightened or darkened to provide a new training image. The synthetic data label of cat or non-cat remains valid after these image transformations. In the application of technology in this description the training data may include answers provided by a person to a list of survey questions. Answers to questions would not be suitable for forming synthetic data. For example, consider a data element representing a relationship labeled as higher quality containing a survey question such as "I want to have children" answered as Strongly Agree, Agree, Neutral or Disagree or Strongly Disagree. This relationship might have both persons in the relationship answering Strongly Agree. Should synthetic data be generated changing an answer from one person to Strongly Disagree then the data element label of higher quality would no longer be valid. These considerations need to be taken into account to restrict the usage of augmented training data in the application of technology in this description to relationships between persons.

Using a Supervised Machine Learning Engine to Recommend Matches

Figure 6:
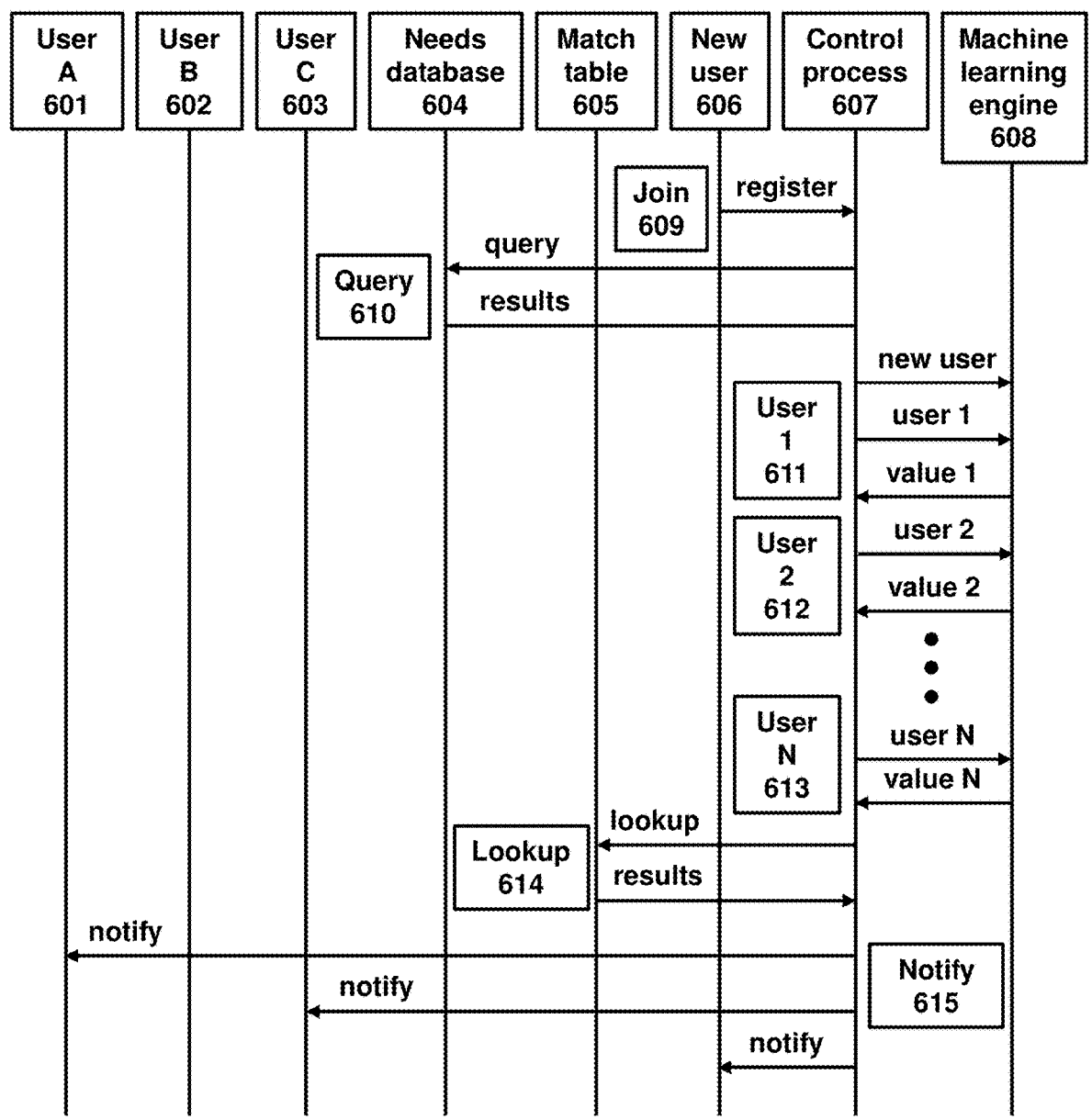
FIG. 6 illustrates an event diagram of providing matches when a new user joins a system.

FIG. 6 illustrates an event diagram of providing matches when a new user joins a system. The process of searching for a matching candidate can be initiated from multiple events. One type of event can be a person seeking a relationship submitting a request for a relationship search. This type of event was previously illustrated in FIG. 1 and FIG. 3. Another type of event can be a periodic search performed by a system on behalf of a person seeking a relationship. The periodic search may find new candidates that have joined the system since the last search on behalf of a person, or may find candidates who have updated their attributes data since the last search. With sufficient resources applied the periodic search can become a continuous search. The type of event illustrated in FIG. 6 is initiated when a new user joins a system. The intent of this process is to find which persons already in the system may find a match with the new user 606.

The event diagram in FIG. 6 is read with time sequencing downwards from the top of the figure. A new user 606 joins 609 a system by registering. A control process 607 then queries 610 a database of candidate needs 604. The database of candidate needs 604 stores matching criteria provided by current persons in the matching system. For example candidate A 601 may request matches with persons ages 23-27 or candidate B 602 may request matches with persons ages 27-33. The results of this query are persons whose matching criteria are satisfied by the new user 606. The query results are returned to the control process 607.

The control process 607 now sequences through candidate matches between the new user 606 and all the existing users included in the query result. The control process 607 provides the attributes of the new user 606 obtained from the registration process to the trained supervised machine learning engine 608. The control process 607 then repeatedly provides the attributes of each candidate person in the query results to the machine learning engine 608. This is performed for the first candidate user 611 in the query results, the second candidate user 612 and continuing through the last candidate user 613 in the query results. Each step such as 611 returns a value from the machine learning engine 608 predicting the quality of a relationship between the two persons being considered.

The values predicting the quality of each candidate relationship are now examined by the control process 607. The highest valued candidate users may be selected. The highest valued candidate users might be judged to be similar by being within a threshold of each other. In this case, priority may be provided to candidates who have waited longer for their most recent match notification than other candidates. The control process 607 performs a lookup 614 from a match table 605. The match table 605 is indexed by the identification of candidate users and records statistics about matches provided to each candidate, such as time since last match provided. The results of the table lookup 614 are returned to the control process 607. These lookup results can be used to sort the highest valued candidates judged to be similar to provide priority to candidates who have waited the longest. Alternatively or additionally a high valued candidate judged to be similar to other high valued candidates may be selected at random by the control process 607. This random selection may serve to distribute match notifications across the population of candidate users so that all candidates can be provided appropriate matches. The means for random selection may be forming a list of the high valued candidates judged to be similar to other high valued candidates, counting the number of candidates in this list, generating a random integer within the range of 1 and the total count, then selecting the high valued candidate in the list corresponding to this generated integer.

The control process 607 then sends a notification 615 to matched candidates. The new user 606 is notified that they are considered a match by designated persons. Each matching candidate already in the system 601 or 603 is notified that a new user has joined the system, the new user satisfying the candidate persons matching criteria and the attributes of the new user 606 and the matched candidate 601 or 603 evaluated by the machine learning engine 608 to be likely to become a successful relationship. In this example existing user A 601 and existing user C 603 receive notifications while existing user B 602 does not receive a notification.

Figure 7:
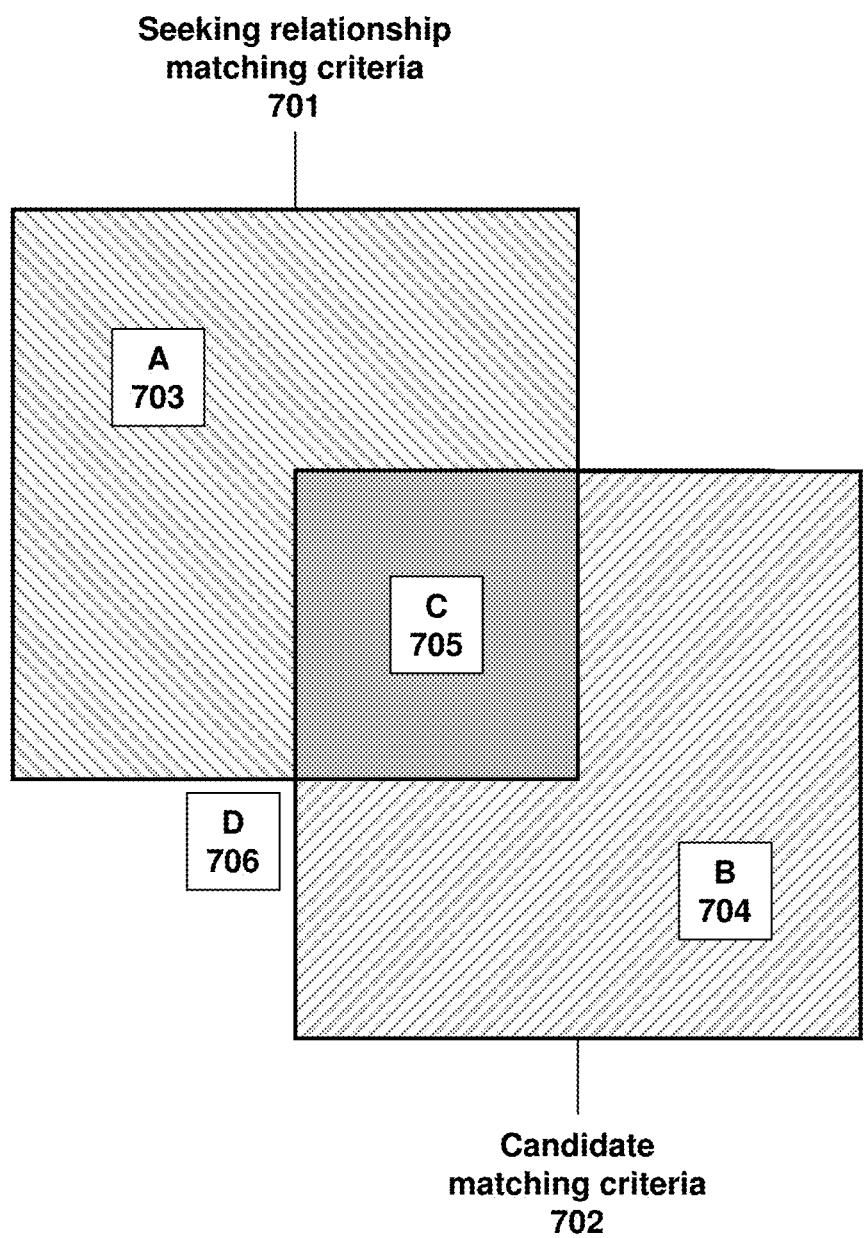
FIG. 7 illustrates a Venn diagram of different criteria for selecting candidates for a match.

FIG. 7 illustrates a Venn diagram of different criteria for selecting candidates for a match. Matching criteria for a person seeking a relationship 701 are denoted by the top left square with shading cross hatched from top left to bottom right. Matching criteria for a person as a candidate for relationship 702 are denoted by the bottom right square with shading cross hatched from top right to bottom left. Region A 703 is the entirety of the square for 701. Region A represents a system finding candidate persons who satisfy the matching criteria provided by the person seeking a relationship. Region B 704 is the entirety of the square for 702. Region B represents a system finding candidate persons whose matching criteria are satisfied by the person seeking a relationship.

Region C 705 is denoted by the smaller darker shaded square in the center of the figure. This region represents the logical AND of regions 701 and 703. Use of region C 705 for matching selects candidate persons who both satisfy the criteria provided by the person seeking a relationship and also the person seeking a relationship matches the criteria provided by the relationship candidates. Region D 706 represents a candidate person for a relationship who is close to matching the criteria provided by persons in the system.

As an illustrative example, consider a person age 35 seeking a relationship providing a match criterion 701 of a candidate being between ages 32-38. A candidate person age 39 does not match this criterion, but is close to matching as determined within a threshold, so could be considered a part of region D 706. Similarly, say a candidate person age 31 provides a match criterion 702 of a match being between ages 28-34. This candidate person does not match the criterion of ages 32-38 provided by the person age 35 seeking a relationship, and the person seeking a relationship age 35 does not match the criterion of ages 28-34 provided by the candidate person age 31. However both are close to matching as determined within a threshold, so the match between the person age 35 seeking a relationship and the candidate person age 31 could be considered a part of region D 706.

It should be noted that other combinations of matching criteria could be considered. One additional example is the logical OR of regions 701 and 702. This combination would constitute all candidate persons matching the criteria provided by the person seeking a relationship 701 plus all candidates whose matching criteria 702 are satisfied by the person seeking a relationship.

Figure 8:
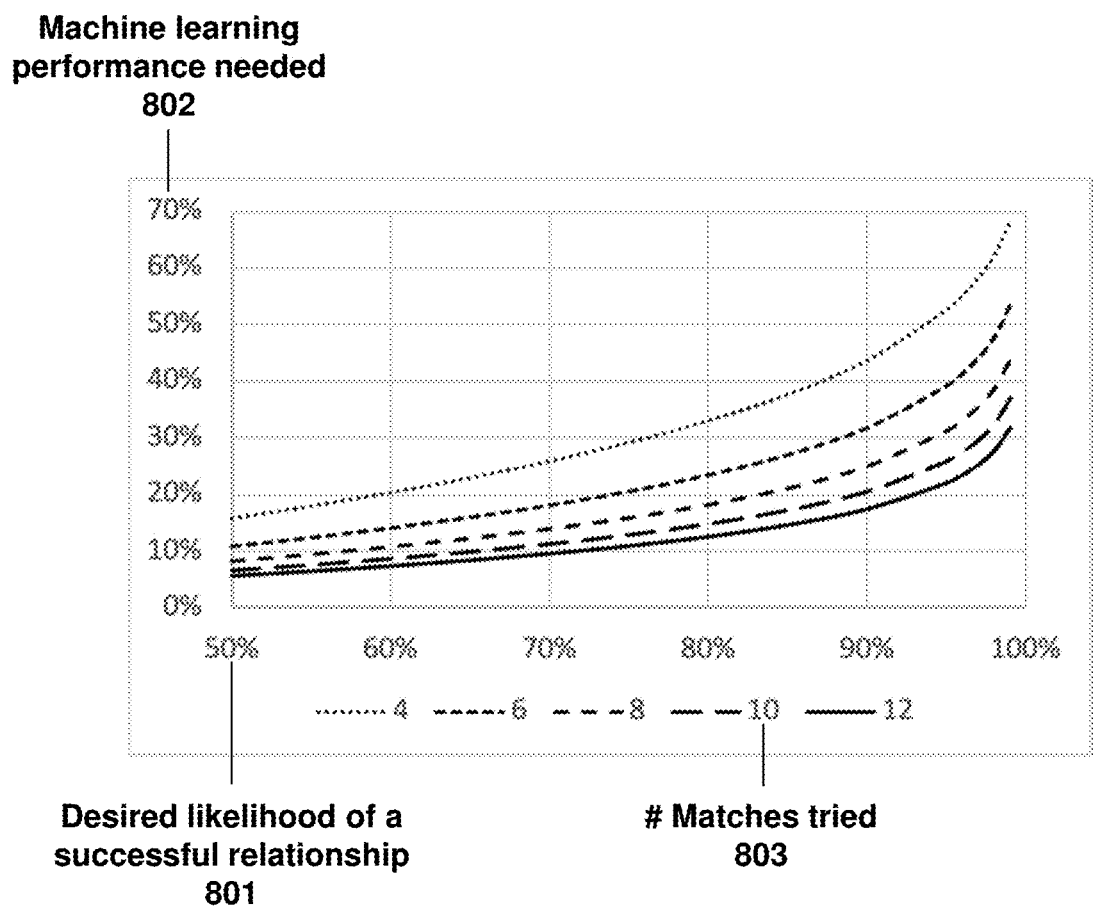
FIG. 8 illustrates a graph of the required performance of a supervised machine learning engine as a function of the desired likelihood of a successful match.

FIG. 8 illustrates a graph of the required performance of a supervised machine learning engine as a function of the desired likelihood of a successful match. Consider a trained supervised machine learning engine that provides performance S in predicting a value representing the quality of a candidate relationship. S for example might be 0.67 representing a 67% probability that the value predicted by the machine learning engine accurately represents how well that candidate relationship would in fact work. Then the probability that the machine learning engine is not accurate is (1−S). If a person seeking a relationship does not succeed with a first match and tries a second match then the probability that the machine learning engine is not accurate for the second match is also (1−S). The conditional probability that the machine learning engine is not accurate for both matches and the person seeking a successful relationship still does not find a match after these two matches is (1−S)*(1−S). This means the probability of success of a result R after two matches is R=1−(1−S)*(1−S). Thus an equation can be formed relating the probability of success result R after M matches as a function of the performance S of the machine learning engine. This equation can be solved for S as a function of R and M to yield equation (1):

$$S = 1 - (1-R)^{1/M} \quad (1)$$

Equation (1) is used to plot the graph in FIG. 8. One can index into this graph on the horizontal axis 801 by selecting a desired probability of success for matching. Then one reads upward to a line representing the number of matches a person is willing to try 803. From this point on the line representing the number of matches a person is willing to try 803 one reads to the left to the vertical axis 802 to ascertain the performance needed by the machine learning engine.

As one example say one desires a 90% probability of success to find a successful match, and is willing to try up to and including ten matches. One reads from 90% on 801 up to the line with the long dashes for ten matches to be tried 803 then across to the left to 20% required performance of the machine learning engine on 802. Another example for a person willing to try up to four matches might expect a 60% probability of finding a successful relationship with a supervised machine learning engine accuracy of 20%. This analysis illustrates that a supervised machine learning engine performing at less than 50% accuracy can result in a successful system, depending upon how many matches are willing to be tried by a person seeking a successful relationship. This is a simplified model which can be confounded by error factors in practice. For example in the field of online dating a person who falsifies their profile such as understating their weight is termed a "catfish", and catfish behavior could degrade the performance of a machine learning engine in predicting relationship values based on incorrect data.

Figure 9:
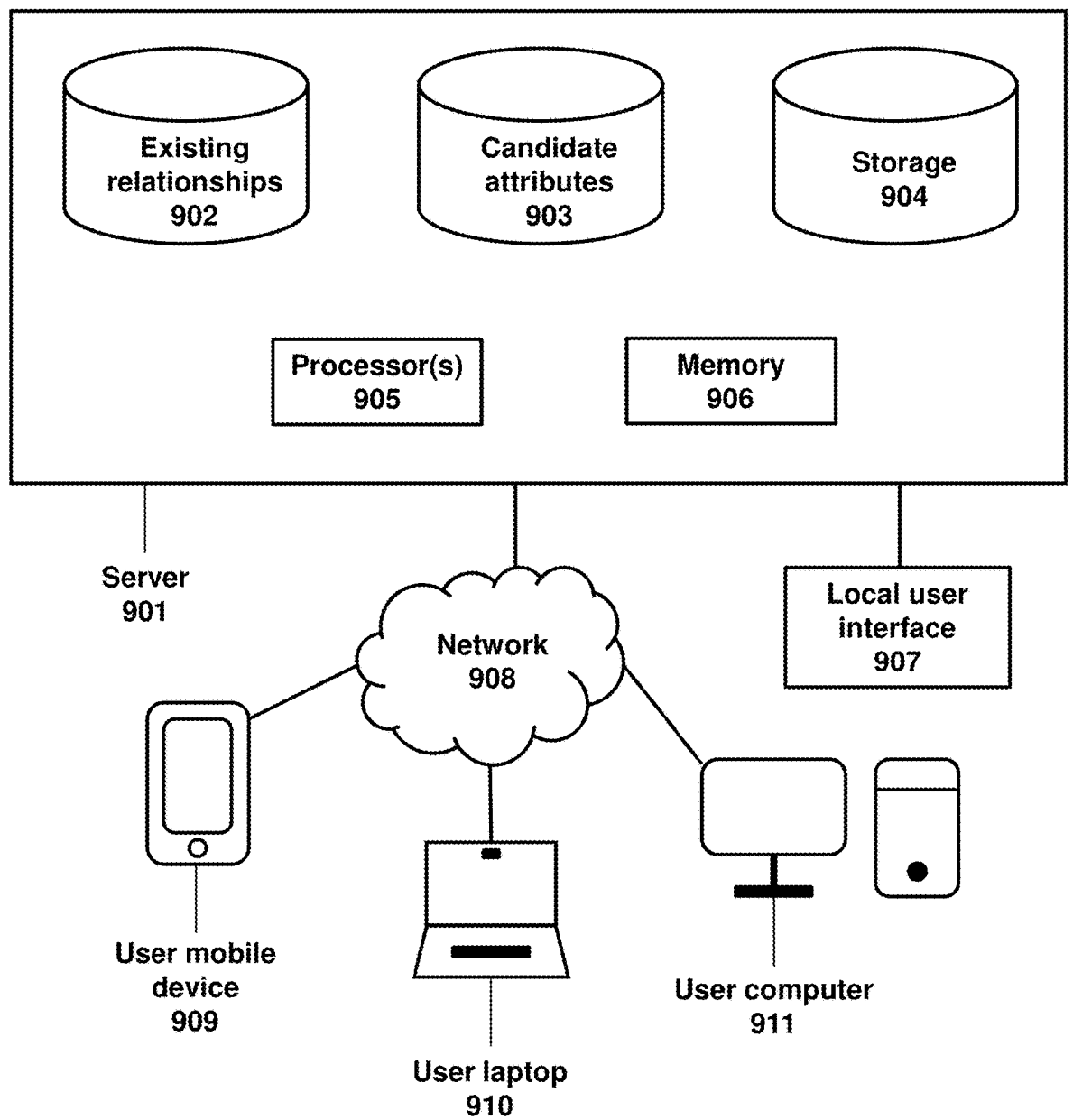
FIG. 9 illustrates a diagram of a system employing databases to store data about empirical relationships and candidate persons for matches, connected over a network to users seeking a match.

Architecture of a System Using a Supervised Machine Learning Engine to Recommend Matches FIG. 9 illustrates a diagram of a system employing databases to store data about empirical relationships and candidate persons for matches, connected over a network to users seeking a match. A server 901 is comprised of processors 905 coupled to memory 906 and to databases. A first database 902 stores empirical data about existing relationships. A second database 903 stores data of attributes about candidates for a relationship, used as inputs to a machine learning engine. Further storage 904 includes candidates criteria for desired matching and other data needed by the system. A local user interface 907 is coupled to the server to provide administration and management of the system.

The server 901 is coupled to a network 908. Users with mobile devices 909 may be coupled to the network 908 to connect to the server 901. Users with laptop devices 910 may be coupled to the network 908 to connect to the server 901. Users with computer devices 911 may be coupled to the network 908 to connect to the server 901.

An illustrative embodiment may comprise a hosting system, including web servers, application servers, database servers, virtual machines, Storage Area Networks (SANs), cloud storage, Local Area Networks (LANs), LAN switches, storage switches, network gateways, and firewalls. An alternate illustrative embodiment may comprise high performance processing, including Graphics Processing Units (GPUs), Custom Systems on a Chip (SoC), Artificial Intelligence Chips (AI Chips), Artificial Intelligence Accelerators (AI Accelerators), Neural Network Processors (NNP), and Tensor Processing Units (TPUs).

The system architecture illustrated in FIG. 9 may perform any of a number of machine learning methods. An illustrative embodiment may perform an instance-based method such as k-Nearest Neighbor (kNN) or Support Vector Machines (SVM). An illustrative embodiment may perform an ensemble method such as Gradient Boosting Machines (GBM), Gradient Boosted Regression Trees (GBRT), Gradient Boosted Decision Trees (GBDT) or Random Forest. An illustrative embodiment may perform an artificial neural network method such as a Convolutional Neural Network (CNN), Recurrent Neural Network, Long Short-Term Memory Neural Network (LSTM), Compound Scaled Efficient Neural Network (EfficientNet), Normalizer Free Neural Network (NFNet), Densely Connected Convolutional Neural Network (DenseNet), Aggregated Residual Transformation Neural Network (ResNeXT), Channel Boosted Convolutional Neural Network (CB-CNN), Wide Residual Network (WRN) or Residual Neural Network (RNN).

Figure 10:
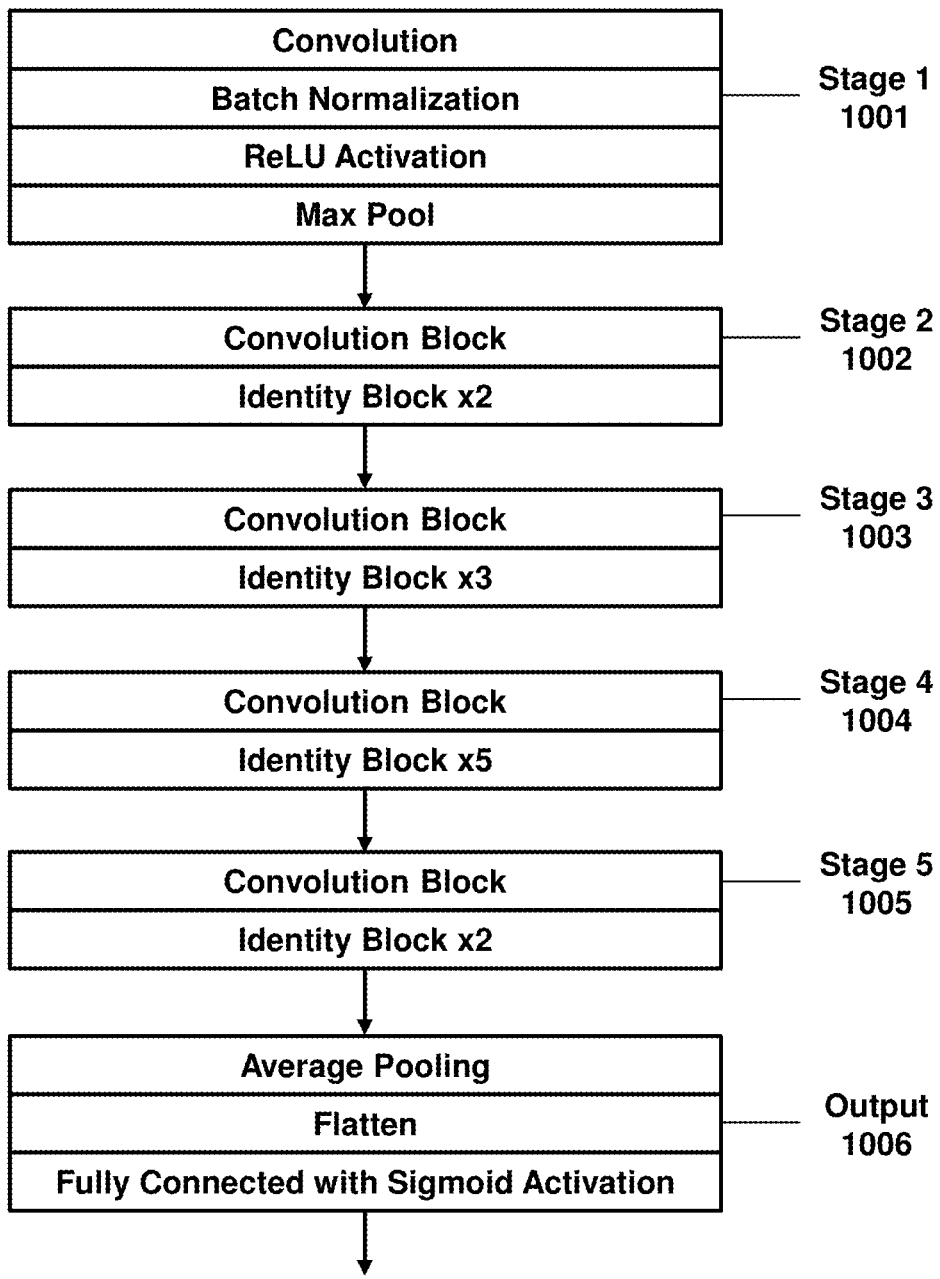
FIG. 10 illustrates the structure of a residual neural network.

FIG. 10 illustrates the structure of a residual neural network as an illustrative embodiment. This particular neural network structure is a 50-layer residual neural network known as ResNet-50. The ResNet-50 structure comprises five stages and an output stage. Stage 1 1001 comprises a convolution block, a batch normalization block, a rectified linear unit (ReLU) activation function and a maximum pooling block. Stage 2 1002 comprises a convolution block and two identity blocks. The identity block is the distinguishing feature of a residual neural network. An identity block adds a shortcut path to skip connections between a lower layer in the network and a higher layer, typically skipping over two or three layers. Use of identity blocks to form a residual neural network has been shown to enable training of networks with much larger numbers of layers. Stage 3 1003 comprises a convolution block and three identity blocks. Stage 4 1004 comprises a convolution block and five identity blocks. Stage 5 1005 comprises a convolution block and two identity blocks. The output stage comprises an average pooling block, a flatten block and a fully connected block with a sigmoid activation function. The final sigmoid activation function outputs a value between 0.0 and 1.0, representing the prediction of the trained neural network as to the quality of a relationship between the two persons whose attributes were inputs to the neural network.

An illustrative embodiment of use of a ResNet-50 may employ attributes of person 1 and person 2 in a relationship implemented as answers to survey questions and facial images. Each color facial image may be a jpg file of 64×64 pixels in three pixel channels of RGB colors. Two persons in a relationship with one facial image for each person may be considered 64×64 pixels in six channels. Each pixel of an unsigned integer in the range of 0 to 255 is scaled to become a number between 0.0 and 1.0. The survey questions for each person in a relationship may consist of 192 questions posed in the form of a statement with an answer response choosing Strongly Agree, Agree, Neutral, Disagree or Strongly Disagree. These answers may be represented by the values 0.1, 0.3, 0.5, 0.7 and 0.9 to place them into the same range as the image data. It is desirable to combine the survey answers and the image data into a size of a power of two for efficiency reasons. This can be done by robbing the lower pixel line in each image to use a 63×64 pixel image, and using those positions for survey answer data. This frees up 192 data points per each image to store the 192 answers per each person.

FIG. 11 illustrates the implementation of a residual neural network. This represents an illustrative embodiment. This particular neural network structure is the 50-layer residual neural network known as ResNet-50 as was illustrated in FIG. 10. This representation is in terms of an implementation of the ResNet-50 written in the Keras deep learning API (application programming interface). Keras runs on top of the machine learning platform TensorFlow.

Stage 1 1101 implements a convolution block, a batch normalization block, a rectified linear unit (ReLU) activation function and a maximum pooling block. Stage 2 1102 implements a convolution block and two identity blocks. Stage 3 1103 implements a convolution block and three identity blocks. Stage 4 1104 comprises a convolution block and five identity blocks. Stage 5 1105 comprises a convolution block and two identity blocks. Average pooling is implemented as illustrated in 1106. The output stage implements a flatten block and a fully connected block with a sigmoid activation function.

Figure 12:
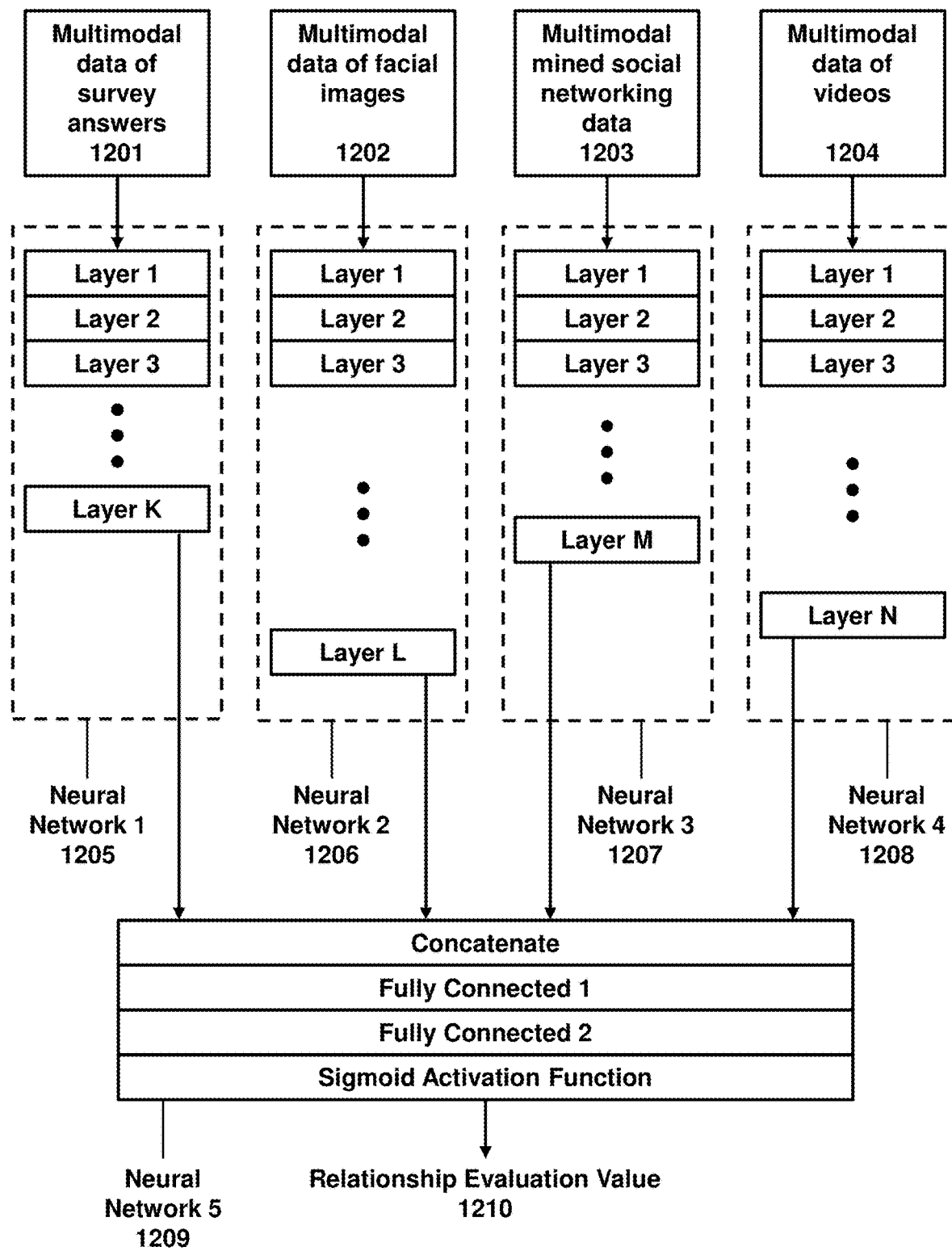
FIG. 12 illustrates the architecture of a heterogeneous hybrid neural network.

FIG. 12 illustrates the architecture of a heterogeneous hybrid neural network. The use of the term "heterogeneous neural network" is not standardized in the field of neural networks, sometimes taken to mean heterogeneous or disparate types of individual neurons. The use of the term "hybrid neural network" is not standardized in the field of neural networks, sometimes meaning heterogeneous or disparate types of activation functions, or sometimes meaning combinations of neural networks with other entities such as support vector machines or even biological neural networks. Thus the new term "heterogeneous hybrid neural network" (HHNN) is used here to clearly differentiate the intended meaning. The HHNN architecture provides one type of neural network appropriate to each type of multimodal data. The outputs of each of these neural networks are concatenated together then combined by a top level neural network. An HHNN represents a preferred embodiment.

Multimodal data of survey answers by each of persons 1 and 2 1201 are input to neural network 1 1205 which has K layers. Multimodal data of facial images of persons 1 and 2 1202 are input to neural network 2 1206 which has L layers. Multimodal data of mined social networking data of persons 1 and 2 1203 are input to neural network 3 1207 which has M layers. Multimodal data of videos of persons 1 and 2 1204 are input to neural network 4 1208 which has N layers. The four neural networks 1205, 1206, 1207 and 1208 may have different numbers of layers and may be different types of neural networks. For example the neural network 2 1206 processing image data may be a residual neural network. For example the neural network 4 1204 processing video data may be a Long Short Term Memory (LSTM) neural network. The outputs of the four neural networks 1205, 1206, 1207 and 1208 are input to the final neural network 5 1209 where they are concatenated together. The neural network 5 1209 has at least one fully connected layer, here two fully connected layers are shown, with the activation function of the final fully connected layer being a sigmoid function to output a value between 0.0 and 1.0. This output value 1210 is the evaluation of the relationship between person 1 and person 2.

It should be noted that embodiments of FIG. 12 can be flexible as to which types of multimodal data to include. One illustrative embodiment may include only one modality of multimodal data such as survey answers 1201, in which case the figure simplifies to one neural network 1 1205 and the HHNN layer of neural network 5 1209 is not needed. Another illustrative embodiment may include two modalities of multimodal data comprising survey answers 1201 and image data 1202, in which case the figure does require the HHNN structure however simplifies to three neural networks 1205, 1206 and 1209.

Figure 13:
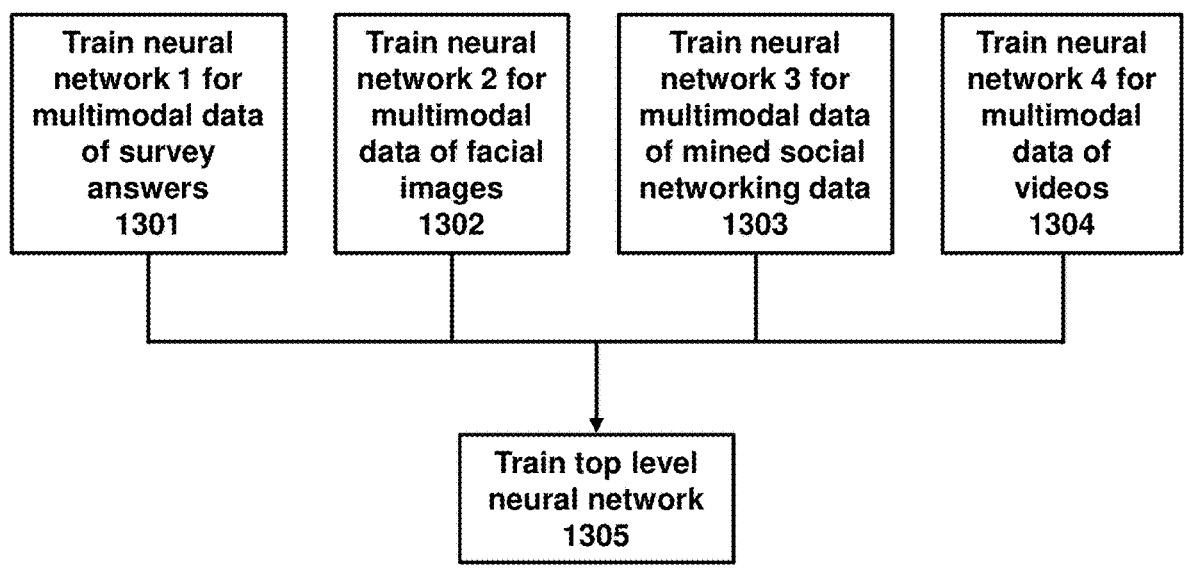
FIG. 13 illustrates the training of a heterogeneous hybrid neural network.

FIG. 13 illustrates the training of an HHNN. A first phase consists of separately training each of the neural networks that are appropriate to each of a variety of multimodal data. The neural network for multimodal data of survey answers 1301 is trained from survey answers for person 1 and for person 2. The neural network for multimodal data of facial images 1302 is trained from facial images of person 1 and of person 2. The neural network for multimodal data of mined social networking data 1303 is trained from mined social networking data of person 1 and of person 2. The neural network for multimodal data of videos 1304 is trained from videos of person 1 and of person 2.

Once the neural networks 1301, 1302, 1303 and 1304 are individually trained then the entire neural network of these four neural networks combined with the top level neural network 1305 is trained. Each epoch in this final training step sequences through all the relationships in the training data forward propagating from the multimodal training data representing a relationship through to the sigmoid output value from the top level neural network 1305. Then the weights and biases in the neural networks are updated by back propagation. This means that each relationship in the training data must be represented by all multimodal data element types, so that all the lower level neural networks 1301, 1302, 1303 and 1304 can contribute to the forward propagation.

The HHNN training process may include two phases of training when including the top level neural network 1305. The first phase may only back propagate through the layers of the top level neural network 1305 for efficiency reasons, serving to initialize the weights in the top level neural network 1305. Once this first phase is completed then the training may be repeated back propagating through all the neural networks.

In the previous detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, compact discs (CD), digital versatile discs (DVD), flash memory (e.g. SD cards), magnetic and/or solid state hard drives, ultra density optical discs, and any other optical or magnetic media. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

The features can be implemented in a computer system that includes a back-end component, such as a data server, or that includes a middleware component, such as an application server or an Internet server, or that includes a front-end component, such as a client computer having a graphical user interface or an Internet browser, or a client mobile device, or any combination of them. The components of the system can be connected by any form or medium of digital data communication such as a communication network. Examples of communication networks include, e.g., a LAN, a WAN, and the computers and networks forming the Internet. The computer system can include clients and servers. A client and server are generally remote from each other and typically interact through a network. The relationship of client and server arises by virtue of computer programs running on the respective computers and having a client-server relationship to each other.

Some implementations include hosting systems, including web servers, application servers, database servers, virtual machines, Storage Area Networks (SANs), cloud storage, Local Area Networks (LANs), LAN switches, storage switches, network gateways, and firewalls. Some implementations include high performance processing, including Graphics Processing Units (GPUs), Custom Systems on a Chip (SoC), Artificial Intelligence Chips (AI Chips), Artificial Intelligence Accelerators (AI Accelerators), Neural Network Processors (NNP), and Tensor Processing Units (TPUs).

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for recommending persons for a relationship, comprising:
    training a supervised machine learning engine from a database of data describing multiple existing relationships;
        wherein the database of data describing multiple existing relationships comprises successful relationships and unsuccessful relationships;
        wherein the data describing each relationship in the database of data describing multiple existing relationships comprises attributes of a first person in the relationship, attributes of a second person in the relationship and an evaluation of the relationship;
            wherein the attributes of the first person in the relationship and the second person in the relationship comprise respective answers provided by the first person and the second person to survey questions;
            wherein the attributes of the first person in the relationship and the second person in the relationship comprise respective facial images of the first person and the second person;
        wherein the supervised machine learning engine comprises a first neural network, the first neural network processing the answers to survey questions provided by the first person and the second person in each relationship, where the first neural network has multiple hidden layers;
        wherein the supervised machine learning engine comprises a second neural network, different from the first neural network, the second neural network processing the facial images provided by the first person and the second person in each relationship, where the second neural network has multiple hidden layers;
    inputting data into the trained supervised machine learning engine attributes of a first person and attributes of a plurality of candidate persons for the relationship;
    utilizing the trained supervised machine learning engine to predict a numerical evaluation of a potential relationship between the first person and each candidate person in the plurality of candidate persons;
        wherein the prediction is based on outputs of the first and second neural networks;
    determining a likelihood of a successful relationship for each candidate person by comparing the numerical evaluation against a threshold; and
    recommending at least one candidate person of the plurality of candidate persons to the first person based on results of the comparing.

2. The method of claim 1, wherein each of the existing relationships comprises two persons in a dating interpersonal relationship.

3. The method of claim 1, wherein each of the existing relationships comprises two persons in an intimate interpersonal relationship.

4. The method of claim 1, wherein the attributes of the first person in the relationship and the second person in the relationship further comprise data mined from respective social networking accounts of the first person and the second person.

5. The method of claim 1, wherein the attributes of the first person in the relationship and the second person in the relationship further comprise respective videos of the first person and the second person.

6. The method of claim 1, wherein training the supervised machine learning engine comprises minimizing the difference between the numerical evaluation of a relationship output by the supervised machine learning engine and the numerical evaluation of that relationship obtained from the database of data describing multiple existing relationships.

7. The method of claim 1, wherein the neural networks comprise a heterogeneous hybrid neural network.

8. A system for recommending persons for a relationship, the system comprising:
    at least one database storing data for multiple existing relationships and attributes of persons who are candidate persons for the relationship;
        wherein the at least one database comprises successful relationships and unsuccessful relationships;
        wherein the data describing each relationship in the at least one database comprises attributes of a first person in the relationship, attributes of a second person in the relationship and an evaluation of the relationship;
            wherein the attributes of the first person in the relationship and the second person in the relationship comprise respective answers provided by the first person and the second person to survey questions;

wherein the attributes of the first person in the relationship and the second person in the relationship comprise respective facial images of the first person and the second person;
a user interface;
at least one processor coupled to the at least one databases and user interface and configured for:
training a supervised machine learning engine from the at least one database;
wherein the supervised machine learning engine comprises a first neural network, the first neural network processing the answers to survey questions provided by the first person and the second person in each relationship, where the first neural network has multiple hidden layers;
wherein the supervised machine learning engine comprises a second neural network, different from the first neural network, the second neural network processing the facial images provided by the first person and the second person in each relationship, where the second neural network has multiple hidden layers;
retrieving from the at least one database attributes of a first person seeking a relationship;
querying the at least one database to retrieve attributes of each candidate person for the relationship with the first person;
utilizing the trained supervised machine learning engine to predict a numerical evaluation of each potential relationship between the first person seeking a relationship and each candidate person in the query results of candidate persons;
wherein the prediction is based on outputs of the first and second neural networks;
determining the likelihood of successful relationships by comparing the numerical evaluations against a threshold; and
recommending to the first person seeking a relationship at least one candidate person based on results of the comparing.

9. The system of claim 8, wherein each of the existing relationships comprises two persons in a dating interpersonal relationship.

10. The system of claim 8, wherein each of the existing relationships comprises two persons in an intimate interpersonal relationship.

11. The system of claim 8, wherein the attributes of the first person in the relationship and the second person in the relationship further comprise data mined from respective social networking accounts of the first person and the second person.

12. The system of claim 8, wherein the attributes of the first person in the relationship and the second person in the relationship further comprise respective videos of the first person and the second person.

13. The system of claim 8, wherein training the supervised machine learning engine comprises minimizing a difference between the numerical evaluation of a relationship output by the supervised machine learning engine and a numerical evaluation of that relationship obtained from the at least one database.

14. The system of claim 8, wherein the neural networks comprises a heterogeneous hybrid neural network.

15. The method of claim 4, wherein the supervised machine learning engine further comprises a third neural network, different from the first and second neural networks, the third neural network processing the data mined from social networking accounts of the first person and the second person in each relationship, where the third neural network has multiple hidden layers.

16. The method of claim 5, wherein the supervised machine learning engine further comprises a fourth neural network, different from the first and second and third neural networks, the fourth neural network processing the videos of the first person and the second person in each relationship, where the fourth neural network has multiple hidden layers.

17. The method of claim 6, further comprising updating the training of the supervised machine learning engine using data of additional existing relationships.

18. The method of claim 15, wherein the prediction is further based on outputs of the first and second and third neural networks.

19. The method of claim 15, wherein the attributes of the first person in the relationship and the second person in the relationship further comprise respective videos of the first person and the second person.

20. The method of claim 16, wherein the prediction is further based on outputs of the first and second and fourth neural networks.

21. The method of claim 19, wherein the supervised machine learning engine further comprises a fourth neural network, different from the first and second and third neural networks, the fourth neural network processing the videos of the first person and the second person in each relationship, where the fourth neural network has multiple hidden layers.

22. The method of claim 21, wherein the prediction is further based on outputs of the first and second and third and fourth neural networks.

23. The system of claim 11, wherein the supervised machine learning engine further comprises a third neural network, different from the first and second neural networks, the third neural network processing the data mined from social networking accounts of the first person and the second person in each relationship, where the third neural network has multiple hidden layers.

24. The system of claim 12, wherein the supervised machine learning engine further comprises a fourth neural network, different from the first and second and third neural networks, the fourth neural network processing the videos of the first person and the second person in each relationship, where the fourth neural network has multiple hidden layers.

25. The system of claim 13, further comprising updating the training of the supervised machine learning engine using data of additional existing relationships.

26. The system of claim 23, wherein the prediction is further based on outputs of the first and second and third neural networks.

27. The system of claim 23, wherein the attributes of the first person in the relationship and the second person in the relationship further comprise respective videos of the first person and the second person.

28. The system of claim 24, wherein the prediction is further based on outputs of the first and second and fourth neural networks.

29. The system of claim 27, wherein the supervised machine learning engine further comprises a fourth neural network, different from the first and second and third neural networks, the fourth neural network processing the videos of the first person and the second person in each relationship, where the fourth neural network has multiple hidden layers.

30. The system of claim 29, wherein the prediction is further based on outputs of the first and second and third and fourth neural networks.

* * * * *